INVENTORS.
JOHN W. MAUSTELLER
ADRIAN C. BILLETDEAUX
RAY S. FREILINO

BY Brown, Critchlow, Flick & Peckham
ATTORNEYS.

United States Patent Office 3,471,698
Patented Oct. 7, 1969

3,471,698
INFRARED DETECTION OF SURFACE CONTAMINATION
John W. Mausteller, Evans City, and Adrian C. Billetdeaux and Ray S. Freilino, Pittsburgh, Pa., assignors to Mine Safety Appliances Company, a corporation of Pennsylvania
Filed Feb. 2, 1967, Ser. No. 613,579
Int. Cl. G01t 1/16
U.S. Cl. 250—83.3                            9 Claims

ABSTRACT OF THE DISCLOSURE

This invention relates to, and has among its principal objects, the use of infrared techniques to detect a contaminant that is deposited as a film on a reflective surface, where the contaminant has a defined infrared absorption band. Infrared radiation covering selected portions of the infrared spectrum is projected onto and reflected from the surface to be tested, and the reflected radiation is monitored to determine (1) the amount of infrared radiation reflected in that wavelength band (analytical band) in which the contaminant to be detected has a strong infrared absorption and (2) the amount of infrared radiation reflected in an adjacent wavelength band or bands (reference band) in which the contaminant does not show strong absorption. The reflected radiation in the analytical band is decreased if the reflecting surface has on it a thin film of the contaminating agent, which by definition absorbs radiant energy in that band not only from the incident beam approaching that surface but also from the reflected beam going away from it, since both beams must pass through the film. On the other hand, the amount of reflected radiation in the reference band serves as a reference standard of the radiation normally reflected from the particular surface in question and is unaffected by the presence or absence of a contaminating agent thereon. Accordingly, a suitable detector, which is arranged to receive the reflected infrared radiation alternately in the analytical and reference bands, may be used to give a differential comparison of the amount of radiation in these two bands and thereby indicate the presence and amount of a contaminating agent on the reflecting surface.

Although not limited thereto, important applications of the present invention include the detection of various insecticides, and other liquid and airborne contaminants, that may be deposited on metal or other infrared reflective surfaces.

SUMMARY OF THE INVENTION

Apparatus for carrying out the invention includes a source that will emit infrared radiation over a range that covers at least a substantial portion of the absorption band of the contaminant and also an adjacent reference band or bands of radiation. Radiation from the source is modulated separately by analytical and reference blocking filters. The analytical blocking filter is transparent to at least part of the reference band or bands but to substantially none of the contaminant band of radiation. The reference filter, in contrast, is transparent to at least part of the contaminant band but to substantially none of the adjacent reference band of radiation. Means are provided for alternately modulating the source radiation with the two blocking filters for alternately projecting analytical and reference beams of radiation (corresponding to the contaminant and reference bands, respectively) onto the test surface from which they are reflected to a suitable detector and measuring means for differentially comparing them.

The invention is described herein with reference to the detection of certain insecticides, which as a class show strong absorption of infrared radiation in a relatively narrow band (about 0.2 microns wide) that is centered at a wavelength of 9.8 microns. It will be understood, however, that the invention is equally applicable to the detection of other contaminants, provided that they have a definite infrared absorption band.

BRIEF DESCRIPTION OF THE DRAWINGS

A preferred embodiment of this invention is described herein in connection with the attached drawings, in which.

DESCRIPTION OF THE PREFERRED EMBODIMENT OF THE INVENTION

Figure 1:
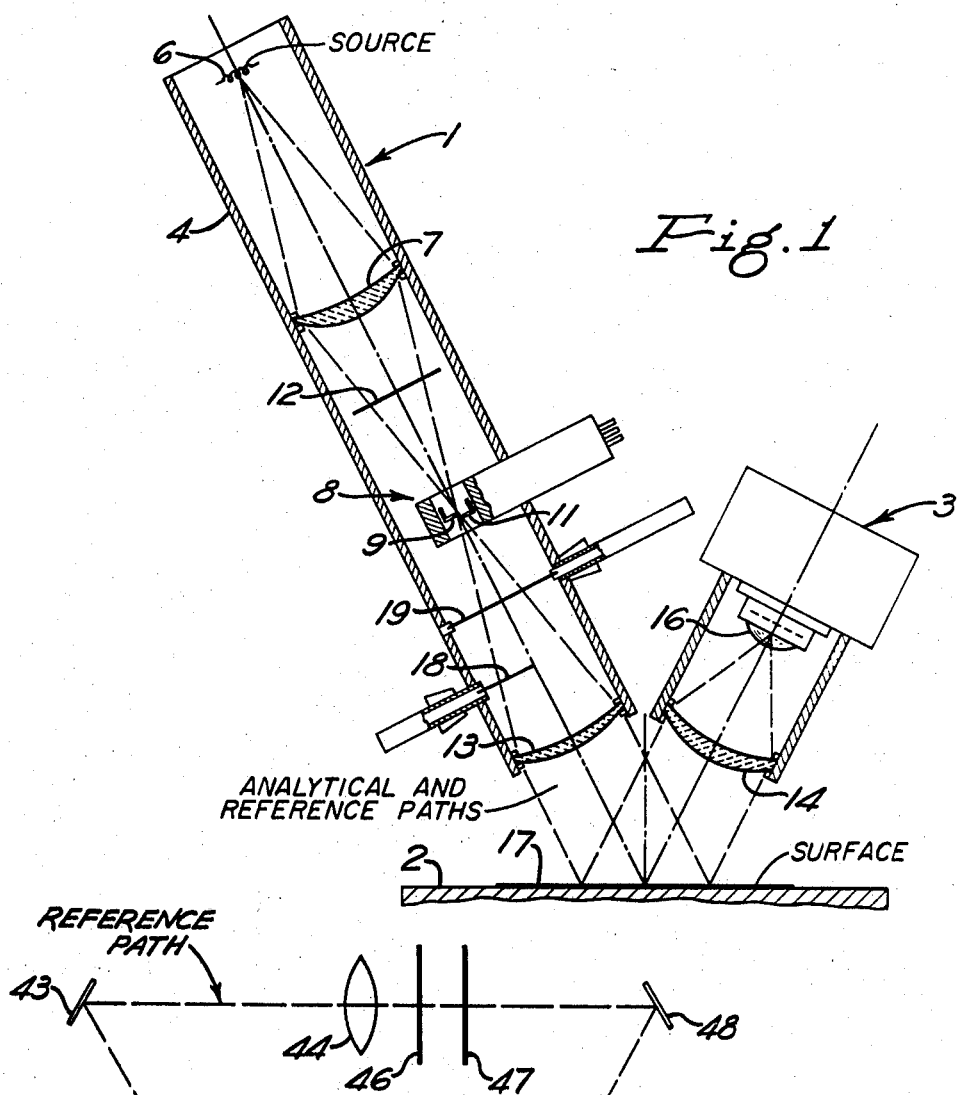
FIG. 1 is a schematic view of a single beam optical system for carrying out the invention.

Referring to FIG. 1, a source module 1 is used to project alternately analytical and reference radiation bands onto a test surface 2 at some fixed angle to that surface, from which the beams are reflected into a detector module 3 where the reflected radiation is measured. The source module 1 includes a tube 4, inside the upper end of which is mounted an electrically heated nichrome filament 6 for emitting radiation over the desired infrared spectrum. Radiation from this source is focused by an infrared transparent lens 7, which, like the other lenses referred to herein, may be a germanium CR Irtran lens, onto one of two filters mounted side by side on a vibrating reed or tuning fork chopper 8. The latter is electrically driven by conventional means (not shown) at some desired frequency, usually between 80 and 150 cycles per second. One of the two filters on the chopper is an analytical blocking filter 9, which may be a talc-impregnated polyethylene filter that blocks radiation in the contaminant band, i.e., in the wavelength band around 9.8 microns that is strongly absorbed by the contaminant to be investigated, but is transparent to radiation in the two adjacent bands centered at 9.6 and 10.0 microns. The other or reference filter 11 may be a Kel-F filter that blocks radiation in those adjacent bands, but is transparent to the contaminant band. Each of the filters 9 and 11 may have an effective aperture of about 4 x 4 millimeters, which is a suitable size for use in a tube having a diameter of about two inches.

In order to minimize unwanted radiation in wavelengths outside the contaminant and reference bands and thereby increase the sensitivity of the instrument, a limiting filter 12 may be mounted in the optical path of radiation from the source. This limiting filter may be a bandpass interference filter made to the desired specifications. Such filters are well-known and consist of an infrared transmitting substrate overlayed with layers of materials of varying reflectance, so that all but the wanted wavelengths interfere and are reflected. This filter may be placed anywhere in the optical path of the source radiation, but is shown in FIG. 1 positioned between condensing lens 7 and chopper 8.

When the reference filter 11 (blocking the reference band but passing the contaminant band) is positioned by the chopper 8 in the optical path of the radiation source 6, an analytical band having a wavelength of 9.8 microns is transmitted by that filter through anexit collimating lens 13 and then projected at the desired angle, for example, 60°, onto the reflecting surface 2 that is to be tested. The beam reffected therefrom is collected and focused by a condensing lens 14 in the detector module onto an infrared responsive detector element 16. When chopper 8 positions the analytical blocking filter 9 (block the contaminant band but passing the reference band) at the focus of the radiation source, then a reference band (in this case, two bands of 9.6 and 10.0 microns) is transmitted along the same optical path. A contaminant film 17, of the type previously indicated, on the surface 2 will absorb energy from the analytical band, but not from the reference band.

The detector 16 may be a germanium immersed thermistor or a solid backed thermistor detector that is responsive to the radiations involved. The detector is connected to a readout device (not shown) through conventional electronic elements, including a preamplifier and an amplifier (also not shown).

Because the instrument here described operates on the principle of comparing the infrared energies of the reflected analytical and reference bands, the readout from the detector is simplified if the energies of the two bands are equal in the absence of a contaminating agent on the surface to be tested. In such case, there will be no modulation of the detector response except in the presence of a contaminant. Inasmuch as it is difficult to match filters to provide the desired band equalization, there is provided instead zero adjustment means in the form of a filter 18, which is manually insertable for variable distances into the optical path of the beam between the chopper 8 and exit lens 13. This zero adjustment filter corresponds in its spectral blocking characteristics to either the analytical or reference filters 9 or 11, respectively, depending upon which of the two bands must be attenuated to obtain band equalization. If the analytical band is the stronger, then the zero adjustment filter corresponds to the analytical filter; but, if the reference band is the stronger, it corresponds to the reference filter. In each case, the zero adjustment filter is adapted to partially block the stronger band (to the extent zero adjustment filter is inserted therein) but to pass the weaker band.

A calibration control 19 may also be incorporated in the source module 1 for calibrating the response of the detector system to a predetermined absorption in the contaminant band of radiation. This control may be a transmission filter made from talc-impregnated polyethylene, that is insertable into the optical path of the analytical and reference bands. This filter is similar to analytical filter 9, but adapted to absorb, instead of entirely blocking, an amount of radiation equivalent to what would be absorbed by a contaminant film of a certain thickness. Control filter 19 is intended to be fully inserted in the source module only while adjusting the gain of the instrument; it is thereafter removed. Control filter 19 may be identical in optical characteristics to filter 9 (that is fully block the contaminant band) in which case it would be temporarily inserted a fixed distance into the tube 4 so that it would absorb only a definite amount of radiation energy of the analytical band.

Figure 2:
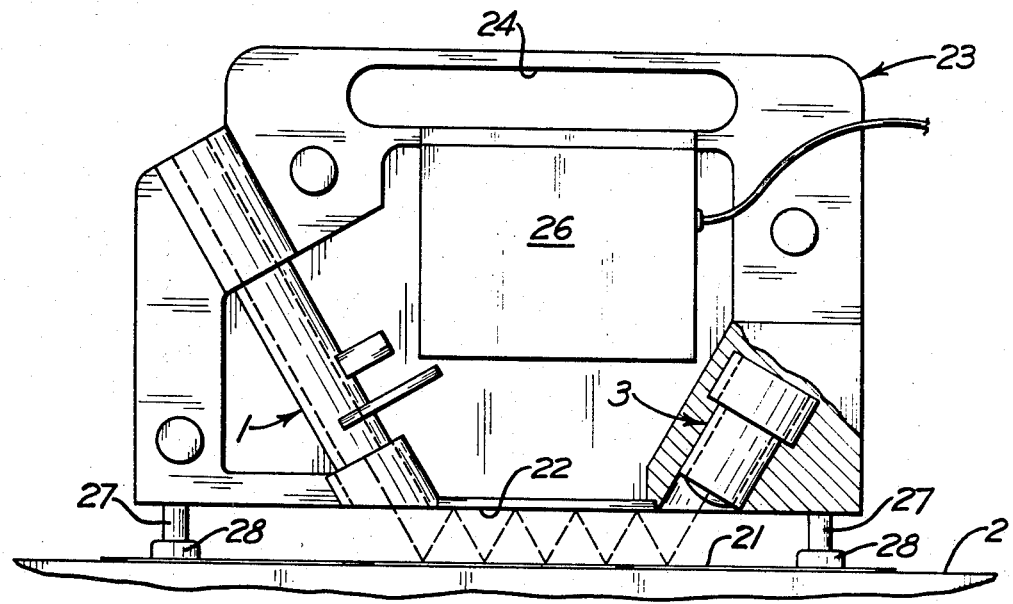
FIG. 2 is an elevation, partly in section, of apparatus embodying a modified single beam optical system.
Figure 3:
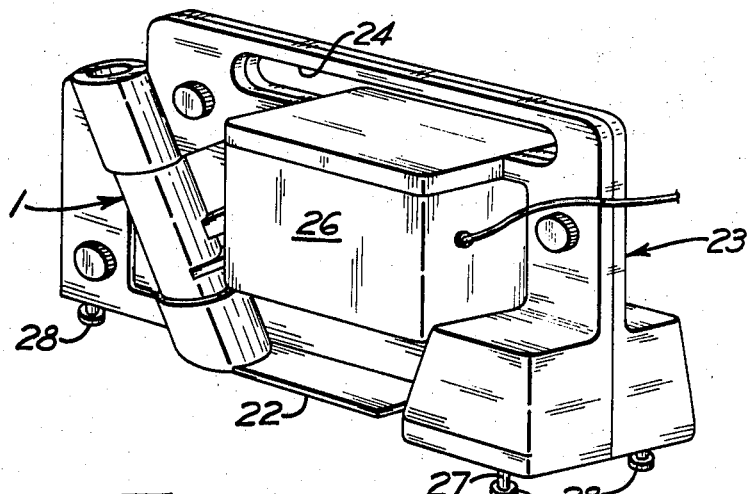
FIG. 3 is a perspective view of the apparatus of FIG. 2.

In FIGS. 2 and 3 is shown a modified single beam optical system, together with means for supporting the source and detector modules in fixed relation to each other, and also means for supporting the instrument on the surface to be tested. The optics of the modified system are identical to those previously discussed in connection with FIG. 1, except that, instead of a single reflection from the surface to be tested, there are multiple reflections from adjacent portions of that surface, with the beam passing twice through any contaminant film 21 thereon for each reflection. Such multiple reflections are obtained by increasing the lateral separation between the source and detector modules and by providing a front surface mirror 22 to act as an intermediate reflector. In this modified arrangement, the optical paths of the analytical and reference bands are as shown in FIG. 2, the bands being reflected five times from the surface to be tested (and passing ten times through the film 21), thereby increasing the sensitivity of the instrument.

FIGS. 2 and 3 also show how the source and detector modules may be supported in a frame member 23, provided with a handgrip 24 and a box-like compartment 26 for holding the electronic equipment. This frame member has legs 27, with disposable pads 28 on their ends, to support the instrument at the proper distance from the surface 2 to be tested. The pads may be removed from the legs and discarded to avoid carrying any contaminant to another location. The same type of frame support, without the front surface mirror and with the source and detector modules closer together, can be used to house the single beam system shown in FIG. 1.

Figure 4:
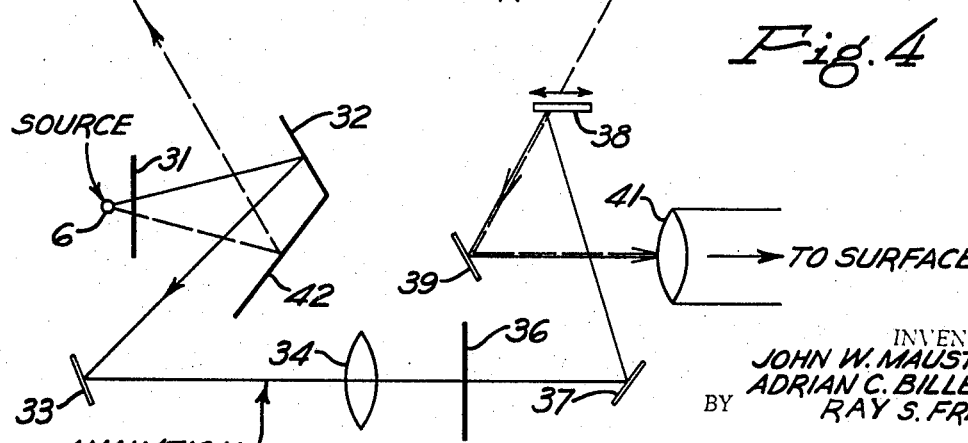
FIG. 4 is a fragmentary schematic view of a double beam optical system for carrying out the invention.

A double beam system is shown in FIG. 4, in which radiation from the source 6 is divided into two separate optical paths, one followed by the analytical beam and the other by the reference beam, the two paths coinciding when the beams leave the source module. In this arrangement, the optical path of the analytical beam is shown in solid lines. From source 6 it passes through a limiting filter 31 (similar to limiting filter 12 in FIG. 1), then via mirrors 32 and 33 through a condensing lens 34 that focuses the beam on an analytical transmission filter 36 (which has spectral characteristics similar to the reference blocking filter 11 of FIG. 1, i.e., it is transparent to the contaminant band but blocks the adjacent bands of radiation), and is then reflected by a third mirror 37 into the plane of a vibrating mirror modulator 38 that is carried by a reed or turning fork chopper (not shown). When the modulator is in a position to intercept the analytical beam reflected from mirror 38, it reflects it to another mirror 39, which in turn reflects it through an exit collimating lens 41 onto the surface to be tested (not shown). By reflection from that surface, the analytical beam is received in a detector module (also not shown) similar to detector module 3 previously described.

The reference beam in the double beam system follows the path shown by the broken line in FIG. 4. It goes from source 6 through limiting filter 31, then via mirrors 42 and 43 through a condensing lens 44 and an adjustable neutral attenuating filter 46 (for zeroing the instrument on the assumption that the reference beam is stronger than the analytical beam, if not, then the attenuating filter would be in the path of the analytical beam), then through a removable reference transmission filter 47 (similar in spectral characteristics to the analytical blocking filter 9 of FIG. 1) located at the focus of the condensing lens, and is finally reflected by a mirror 48 through the plane of modulator 38 (i.e., when the beam is not intercepted by the modulator during that half-cycle of its chopping movement when it is intercepting and reflecting the analytical beam) to mirror 39, from which the reference beam follows the optical path previously described for the analytical beam. Modulator 38 moves back and forth at a frequency corresponding to that of chopper 8 in FIG. 1, and serves the same purpose, that is, to project alternately the reference and analytical beams onto the reflective surface to be tested.

As in the single beam system described in connection with FIG. 1, a calibration control filter (not shown) can be inserted in the analytical path of the double beam system to simulate a contaminant film having a predetermined energy absorption in the analytical band. This filter would merely be inserted temporarily to calibrate the instrument to provide a standard response for a given absorption of the analytical wavelength.

It is an advantage of the double beam system that the analytical and reference filters may be easily removed and replaced by others, making it more flexible than the single beam system for detecting a variety of contaminants. Another advantage is that zeroing can be obtained with a single neutral attenuator that attenuates equally all wavelengths passing through it, instead of the more complex limited wavelength filter used in the single beam system of FIG. 1. Both systems, however, have the capability of analyzing contaminant films without removing the film from the surface to be tested, or even contacting that surface. In the latter case, the source and detector modules can be arranged with a very small angle between their optical axes, so that, with only a little lateral separation, a beam projected from the source module can be reflected from the test surface and back into the detector module when the test surface is located a considerable distance away from the instrument.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. An infrared absorption analyzer for detecting on a reflecting surface the presence of a thin film of a contaminant that has a defined infrared absorption band, comprising a source emitting infrared radiation over a range that includes at least a substantial portion of the absorption band of the contaminant and an adjacent band of radiation, a first filter that is transparent to a substantial part of the radiation in the absorption band of the contaminant but to substantially none of the adjacent band of radiation, a second filter that is transparent to a substantial part of said adjacent band of radiation but to substantially none of the radiation in the absorption band of the contaminant, chopper means for projecting said infrared radiation alternately as an analytical band of radiation from the source through the first filter to the surface to be tested and then as a reference band of radiation from the source through the second filter to that same surface, and radiation responsive means positioned for receiving such transmitted radiation solely by reflection from said surface and for measuring the radiation energies of the reflected analytical and reference bands.

2. Apparatus according to claim 1 that also includes a limiting filter in the optical path of both the analytical and reference bands for blocking unwanted radiation outside the absorption band of the contaminant and predetermined adjacent bands of radiation.

3. Apparatus according to claim 1 that also includes zero adjusting means for equalizing the radiation energy in the analytical and reference bands in the absence of a contaminant on the surface to be tested.

4. Apparatus according to claim 1 that also includes a calibration control filter that absorbs some but not all of the analytical band of radiation, but is transparent to the reference band of radiation, for simulating the absorption of a given contaminant film of predetermined thickness on the surface to be tested.

5. Apparatus according to claim 1 that also includes a focusing lens on the incident side of the filters and a collimating lens on the exit side of the filters, the lenses being transparent to both the analytical and reference bands.

6. Apparatus according to claim 1, in which the analytical and reference bands follow the same optical path and in which the chopper means includes a vibrating member that supports the first and second filters for inserting those filters alternately into said optical path.

7. Apparatus according to claim 6 that also includes zero adjusting means having spectral characteristics similar to one of the first and second filters for attenuating the stronger of the analytical and reference bands in the absence of a contaminant on the surface to be tested.

8. Apparatus according to claim 1, in which the analytical and reference bands follow different optical paths to the surface to be tested and in which the chopper means includes a vibrating member that supports means for periodically interrupting one of said bands while reflecting the other onto the surface to be tested.

9. Apparatus according to claim 8 that also includes zero adjusting means in the form of an attenuating filter that transmits infrared radiation substantially equally in the radiation bands projected onto the surface to be tested, the attenuating filter being located in the optical path of the stronger of the analytical and reference bands.

References Cited

UNITED STATES PATENTS

| | | | |
|---|---|---|---|
| 2,775,160 | 12/1956 | Foskett et al. | 250—43.5 X |
| 3,048,699 | 8/1962 | Francis. | |
| 3,179,798 | 4/1965 | Savitzky | 250—43.5 |
| 3,194,962 | 7/1965 | Carlon et al. | |

ARCHIE R. BORCHELT, Primary Examiner

U.S. Cl. X.R.

250—43.5